(12) United States Patent
Gvildys et al.

(10) Patent No.: US 9,729,492 B2
(45) Date of Patent: Aug. 8, 2017

(54) INTELLIGENT RESOURCE MANAGER SERVICE RECOVERY INCLUDING REQUEST RETRANSMISSIONS

(71) Applicant: GENESYS TELECOMMUNICATIONS LABORATORIES, INC., Daly City, CA (US)

(72) Inventors: Paul Gvildys, Toronto (CA); Vinod Madhavan, Chennai (IN); Gaurav Mehrotra, Markham (CA); Henry Lum, Markham (CA); Herbert Willi Artur Ristock, Walnut Creek, CA (US); Atul Edlabadkar, Chennai (IN)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 234 days.

(21) Appl. No.: 14/741,251

(22) Filed: Jun. 16, 2015

(65) Prior Publication Data
US 2015/0365370 A1 Dec. 17, 2015

Related U.S. Application Data

(60) Provisional application No. 62/012,941, filed on Jun. 16, 2014.

(51) Int. Cl.
G06F 15/16 (2006.01)
H04L 12/58 (2006.01)
(Continued)

(52) U.S. Cl.
CPC .......... *H04L 51/30* (2013.01); *G06Q 30/016* (2013.01); *H04L 41/0663* (2013.01);
(Continued)

(58) Field of Classification Search
CPC .............. G06Q 30/016; H04L 41/0695; H04L 43/0811; H04L 51/30; H04L 65/1006; H04L 65/105; H04L 67/145; H04L 69/40
See application file for complete search history.

(56) References Cited

U.S. PATENT DOCUMENTS 7,616,585 B1 * 11/2009 Kritov ..................... H04L 47/10
370/231
8,831,203 B2 9/2014 Chang et al.
(Continued)

*Primary Examiner* — Mohamed Wasel
(74) *Attorney, Agent, or Firm* — Lewis Roca Rothgerber Christie LLP

(57) ABSTRACT

A system for providing media services on behalf of a customer contact center includes: a processor; and a memory, wherein the memory has stored thereon instructions that, when executed by the processor, cause the processor to: transmit and receive signaling messages to and from a control server over an established data network connection; in response to the signaling messages, invoke a media device for transmitting media to an end-user device; detect loss of the data network connection; identify a configurable parameter for determining whether a failed message transmission should be retried; and in response to determining that the failed message transmission should be retried, re-transmitting the failed message to the control server.

18 Claims, 7 Drawing Sheets

(51) Int. Cl.
  *G06Q 30/00*  (2012.01)
  *H04L 12/26*  (2006.01)
  *H04L 12/24*  (2006.01)
  *H04L 29/14*  (2006.01)
  *H04L 29/06*  (2006.01)
  *H04L 29/08*  (2006.01)

(52) U.S. Cl.
  CPC ...... *H04L 41/0695* (2013.01); *H04L 43/0811* (2013.01); *H04L 65/105* (2013.01); *H04L 65/1006* (2013.01); *H04L 69/40* (2013.01); *H04L 43/0817* (2013.01); *H04L 67/145* (2013.01)

(56) References Cited

U.S. PATENT DOCUMENTS

| | | | |
|---|---|---|---|
| 2009/0077246 A1* | 3/2009 | Lee | H04N 7/17336 709/229 |
| 2010/0074100 A1* | 3/2010 | Suzuki | G06F 11/2025 370/221 |
| 2011/0310744 A1* | 12/2011 | Besset | H04L 41/0686 370/241 |

* cited by examiner

INTELLIGENT RESOURCE MANAGER SERVICE RECOVERY INCLUDING REQUEST RETRANSMISSIONS

CROSS-REFERENCE TO RELATED APPLICATION

This utility patent application claims priority to and the benefit of U.S. Provisional Patent Application Ser. No. 62/012,941, filed Jun. 16, 2014, entitled "INTELLIGENT RESOURCE MANAGER SERVICE RECOVERY INCLUDING REQUEST RETRANSMISSIONS," the entire content of which is incorporated herein by reference.

BACKGROUND

A typical contact center system may utilize a high-availability Session Initiation Protocol (SIP) server for transmitting signaling messages between different SIP endpoints. For example, the SIP server may transmit commands for causing a media server to play voice prompts to a calling end user device. When the primary SIP server fails, a backup SIP server becomes active and takes over the responsibilities of the primary SIP server. During the switchover to the backup SIP server, however, messages directed to the SIP server may be unsuccessful. For example, in the event that the backup server is taking over the virtual IP address of the primary SIP server, there is a period of time in which the virtual IP is freed (not binded) to any network interface, causing any attempts to send a message to the virtual IP address to fail. This may result in an incorrect assumption that there is no SIP server connectivity.

There may also be other reasons as to why a message to a SIP server fails. Thus, it may be generally desirable to identify the cause of such failure to allow calls to the contact center to be serviced as smoothly as possible.

The above information disclosed in this Background section is only for enhancement of understanding of the background of the invention, and therefore, it may contain information that does not form prior art.

SUMMARY

One or more embodiments of the present invention relate to a system for providing media services on behalf of a customer contact center.

One or more embodiments of the present invention relate to a method for providing media services on behalf of a customer contact center.

According to one embodiment, a system for providing media services on behalf of a customer contact center includes: a processor; and a memory, wherein the memory has stored thereon instructions that, when executed by the processor, cause the processor to: transmit and receive signaling messages to and from a control server over an established data network connection; in response to the signaling messages, invoke a media device for transmitting media to an end-user device; detect loss of the data network connection; identify a configurable parameter for determining whether a failed message transmission should be retried; and in response to determining that the failed message transmission should be retried, re-transmitting the failed message to the control server.

A value of the configurable parameter may be dynamically adjusted during the transmitting and the receiving of the signaling message, based on learned conditions.

The learned conditions may include data corresponding to an increase in load on the control server, the configurable parameter may include at least one of a timeout value and a number of retries, and the adjustment of the configurable parameter may include at least one of increasing the timeout value and increasing the number of retries.

The configurable parameter may include a number of retries.

The instructions may further cause the processor to: in response to exhausting the number of retries, return an error message.

The configurable parameter may include a timeout value.

The instructions may further cause the processor to: in response to reaching the timeout value, return a timeout message.

In response to detecting the loss of the data network connection, the instructions may further cause the processor to monitor network signaling messages transmitted between the control server and another server to determine whether or not the other server is able to communicate with the control server.

The instructions may further cause the processor to: in response to determining that the other server is able to communicate with the control server, instruct a routing server to rout calls directly to an agent.

The instructions may further cause the processor to: return instructions to play a media file stored in a datastore.

According to one embodiment, a method for providing media services on behalf of a customer contact center includes: transmitting and receiving, by a processor, signaling messages to and from a control server over an established data network connection; invoking, by the processor, in response to the signaling messages, a media device for transmitting media to an end-user device; detecting, by the processor, loss of the data network connection; identifying, by the processor, a configurable parameter for determining whether a failed message transmission should be retried; and in response to determining that the failed message transmission should be retried, re-transmitting, by the processor, the failed message to the control server.

A value of the configurable parameter may be dynamically adjusted, by the processor, during the transmitting and the receiving of the signaling message, based on learned conditions.

The learned conditions may include data corresponding to an increase in load on the control server, the configurable parameter may include at least one of a timeout value and a number of retries, and the adjustment of the configurable parameter may include increasing, by the processor, at least one of the timeout value and the number of retries.

The configurable parameter may include a number of retries.

The method may further include, in response to exhausting the number of retries, returning, by the processor, an error message.

The configurable parameter may include a timeout value.

The method may further include, in response to reaching the timeout value, returning, by the processor, a timeout message.

The method may further include: in response to detecting the loss of the data network connection, monitoring, by the processor, network signaling messages transmitted between the control server and another server to determine whether or not the other server is able to communicate with the control server.

The method may further include: in response to determining that the other server is able to communicate with the control server, instructing, by the processor, a routing server to rout calls directly to an agent.

The method may further include: returning, by the processor, instructions to play a media file stored in a datastore.

BRIEF DESCRIPTION OF THE DRAWINGS

The above and other aspects and features of the present invention will become apparent to those skilled in the art from the following detailed description of the example embodiments with reference to the accompanying drawings.

DETAILED DESCRIPTION

Figure 1:
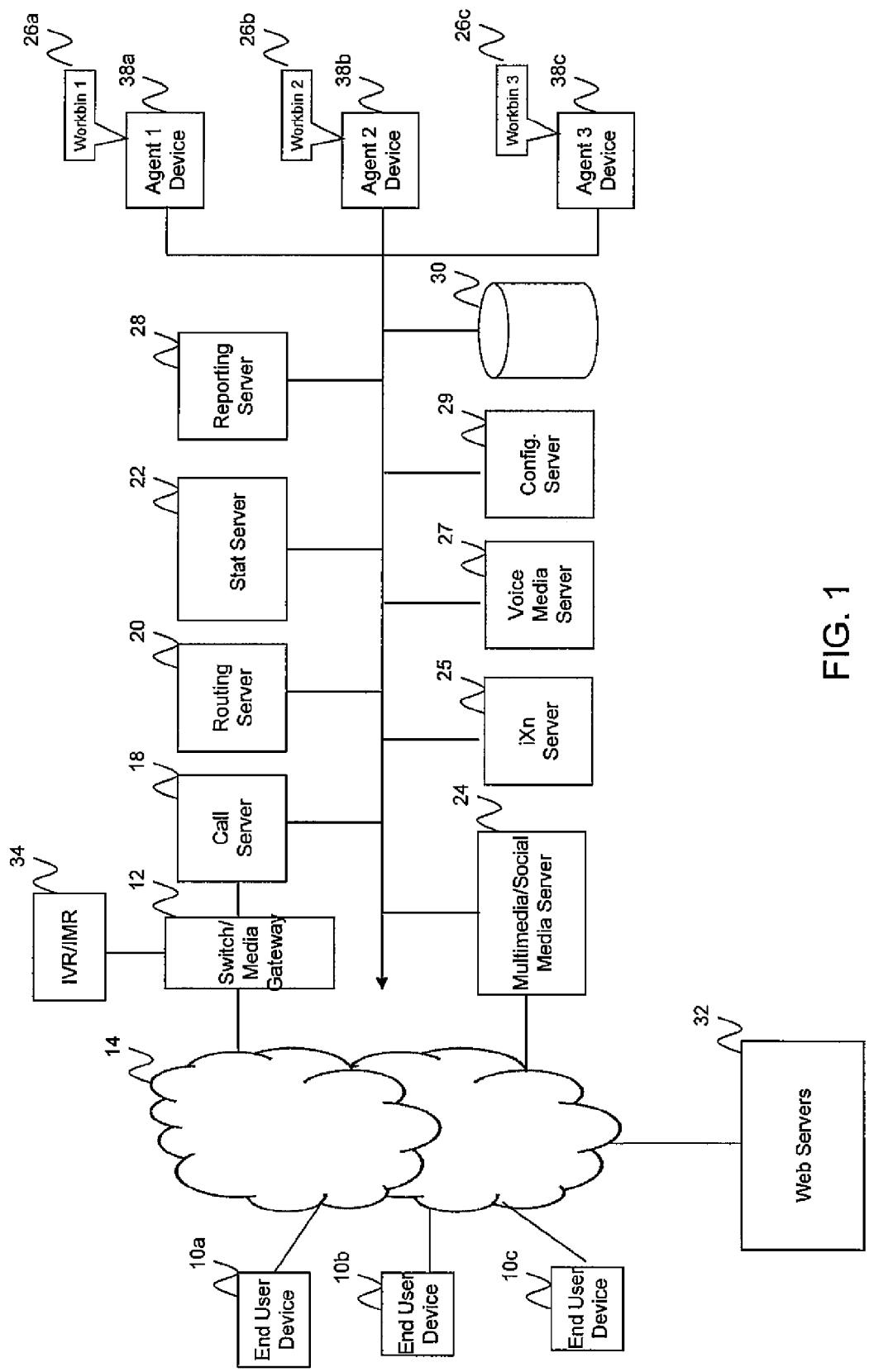
FIG. 1 is a schematic block diagram of a contact center system for providing contact center services according to one embodiment of the invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In general terms, one or more embodiments of the present invention are directed to allowing retries of messages transmitted via a reliable channel, such as, for example, a transmission control protocol (TCP) channel, even when a first try results in failure. TCP may be deemed to be reliable in the sense that it requires a connection and checks sequence numbers on the packets that are received. If a packet is missing, it requests the missing packet(s). Although TCP is used as an example, a person of skill in the art should understand that embodiments of the present invention apply to channels utilizing other protocols, such as, for example, user datagram protocol (UDP).

According to one embodiment, the retry applies to failed messages transmitted to a high-availability SIP server. The transmission retry of a failed message continues until there is a successful connection to the SIP server, a preset number of retries is exhausted, or a preset timeout value is reached. According to one embodiment, the retry parameters (e.g. number of retries and timeout value) are user configurable.

According to one embodiment, the retry parameters may also be adjusted automatically by, for example, the RM 210, based on real-time analysis of current working conditions of the contact center, or analysis of available historical data.

FIG. 1 is a schematic block diagram of a contact center system for providing contact center services according to one embodiment of the invention. The contact center system may be an in-house facility to a business or corporation for serving the enterprise in performing the functions of sales and service relative to the products and services available through the enterprise. In another aspect, the contact center system may be a third-party service provider. The contact center system may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one exemplary embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center system may initiate inbound telephony calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound telephony calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 12 coupled to the communications network 14 for receiving and transmitting telephony calls between end users and the contact center. The switch/media gateway 12 may include a telephony switch configured to function as a central switch for agent level routing within the center. The switch may be a hardware switching system or a soft switch implemented via software. For example, the switch 12 may include an automatic call distributor, a private branch exchange (PBX), an IP-based software switch, and/or any other switch configured to receive Internet-sourced calls and/or telephone network-sourced calls from a customer, and route those calls to, for example, an agent telephony device. In this example, the switch/media gateway establishes a voice path (not shown) between the calling customer and the agent telephony device, by establishing, for example, a connection between the customer's telephone line and the agent's telephone line.

According to one exemplary embodiment of the invention, the switch is coupled to a call server 18 which may, for example, serve as an adapter or interface between the switch and the remainder of the routing, monitoring, and other call-handling components of the contact center system.

The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as the caller's telephone number, often known as the automatic number identification (ANI) number, or the customer's internet protocol (IP) address, or email address, and communicate with other CC components and/or CC iXn controller in processing the call.

According to one exemplary embodiment of the invention, the system further includes an interactive media response (IMR) server 34, which may also be referred to as a self-help system, virtual assistant, or the like. The IVR/ IMR server 34 may be similar to an interactive voice response (IVR) server, and hence, is sometimes referred to as an IVR server, except that the IMR server is not restricted to voice, but may cover a variety of media channels including voice. Taking voice as an example, however, the IVR/ IMR server 34 may be configured with an IVR script for querying calling customers on their needs. For example, a contact center for a bank may tell callers, via the IVR script, to "press 1" if they wish to get an account balance. If this is the case, through continued interaction with the IVR, customers may complete service without needing to speak with an agent. The IVR/IMR server 34 may also ask an open ended question such as, for example, "How can I help you?" and the customer may speak or otherwise enter a reason for contacting the contact center. The customer's response may then be used by a routing server 20 to route the call to an appropriate contact center resource.

If the call is to be routed to an agent, the call server 18 interacts with the routing server 20 to find an appropriate agent for processing the call. The selection of an appropriate agent for routing an inbound call may be based, for example, on a routing strategy employed by the routing server 20, and further based on information about agent availability, skills, and other routing parameters provided, for example, by a statistics server 22.

In some embodiments, the routing server 20 may query a customer database, which stores information about existing clients, such as contact information, service level agreement (SLA) requirements, nature of previous customer contacts and actions taken by contact center to resolve any customer issues, and the like. The database may be, for example, Cassandra or any non-SQL database, and may be stored in a mass storage device 30. The database may also be a SQL database an may be managed by any database management system such as, for example, Oracle, IBM DB2, Microsoft SQL server, Microsoft Access, PostgreSQL, MySQL, FoxPro, and SQLite. The routing server 20 may query the customer information from the customer database via an ANI or any other information collected by the IMR server 34.

Once an appropriate agent is available to handle a call, a connection is made between the caller and the agent device 38a-38c (collectively referenced as 38) of the identified agent. Collected information about the caller (e.g. via interaction with the IMR server 34) and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms.

The contact center system may also include a multimedia/ social media server 24 for engaging in media interactions other than voice interactions with the end user devices 10 and/or web servers 32. The media interactions may be related, for example, to email, vmail (voice mail through email), chat, video, text-messaging, web, social media, co-browsing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center system. End users may browse the web pages and get information about the enterprise's products and services. The web pages may also provide a mechanism for contacting the contact center system, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 25 interacts with the routing server 20 for selecting an appropriate agent to handle the activity. Once assigned to an agent, the activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 30 or elsewhere. The mass storage device may take form of a hard disk or disk array as is conventional in the art.

The contact center system may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

The contact center system may also include a voice media server 27 that provides a voice platform on which applications may be run to provide voice media services for interactions in and out of the contact center. The media services may include, for example, playing audio/video prompts during a customer self-service session with an interactive voice response (IVR) server, playing music while a caller waits to be routed to an agent, or the like. In this regard, the voice media server 27 may include all of the hardware (e.g., media devices) and software necessary to deliver and playback audio/video media to the caller (e.g., end-user device).

According to one embodiment, the voice medial server 27 may provide all or some of the functionality provided by the IVR/IMR server 34. In this regard, the voice media server 27 may be integrated into the IVR/IMR server 34 (or vice-versa), or exist as a component or module separate from the IVR/IMR server 34.

The contact center system may also include a configuration server 29 configured to store configuration data of the various components of the contact center system. In one embodiment, the configuration server 29 may be included as part of a management framework, and may be accessed by the various components of the contact center system to identify respective configuration data of the various components. In one embodiment, one component may access the configuration data of another component.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 2:
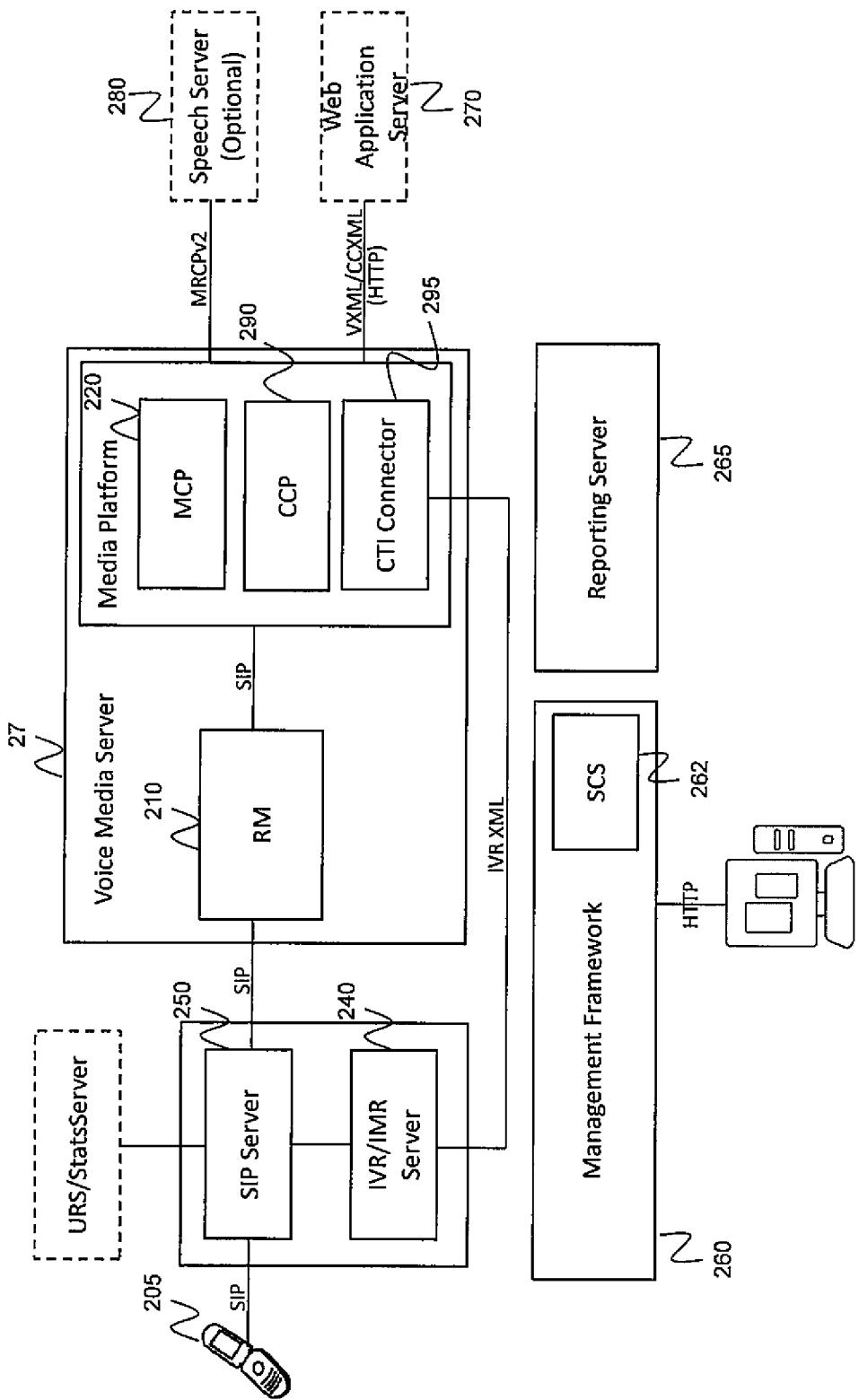
FIG. 2 is a more detailed schematic block diagram of certain components of a contact center system according to one embodiment of the invention.

FIG. 2 is a more detailed schematic block diagram of certain components of a contact center system according to one embodiment of the invention. All or some of the components of the contact center system may be hosted at a premise of the contact center, and/or may be hosted in a remote computing environment such as, for example, a cloud computing environment.

According to one embodiment, the contact center system includes a SIP server 250 coupled to a resource manager (RM) 210 which is in turn coupled to a pool of media control platforms (MCPs) 220. The SIP server 250 may be similar to the call server 18 of FIG. 1. According to one embodiment, the RM and MCPs run on the voice media server 27 to provide media services for interactions in and out of the contact center. According to one embodiment, the SIP server 250 may be configured to communicate with one high-availability RM pair. In other embodiments, the SIP server may be configured to communicate with multiple RM pairs. For example, one RM pair may be dedicated for recording, another RM pair for IVR interaction, and the like. A particular RM pair may also be configured to interact with multiple SIP server pairs.

According to one embodiment, the SIP server 250 acts as a SIP B2UBA, and controls the flow of SIP requests and responses between SIP endpoints. Any other suitable control server configured to set up and tear down voice over internet protocol (VoIP) communication session may be contemplated in addition or in lieu to the SIP server 250 as will be apparent to a person of skill in the art. The SIP server 250 may be a separate logical component or combined with the RM 210. Although a SIP server 250 is used as an example in the various embodiments of the present invention, a person of skill in the art should recognize that any other suitable control/call server configured with any other suitable VoIP protocol may be used in addition or in lieu of SIP, such as, for example, the well-known H.232 protocol, Media Gateway Control Protocol, Skype protocol, and the like.

According to one embodiment, the SIP server 250 is a high-availability SIP server including primary and backup SIP server pairs. The primary SIP server is active and is reachable via, for example, a virtual IP address. When the primary SIP server becomes unreachable due to its failure or for any other reason which prevents its connection, a switchover to the backup SIP server occurs. In this case, according to one embodiment, the backup SIP server assumes the virtual IP address and takes the role of the primary SIP server. According to one embodiment, the switchover is controlled by a system control server (which may also be referred to as a solution control server) 262 (SCS) in a management framework 260 which is configured to monitor the health of various components of the contact center system. According to other embodiments, the SIP server 250 functions in a standalone mode and is not configured for high-availability.

The RM 210 is configured to allocate and monitor a pool of MCPs 220 for providing load balancing and high availability for each resource type. According to one embodiment, the RM 210 monitors and selects a MCP 220 from a cluster of available platforms.

According to one embodiment, the RM 210 is configured to process requests for services (e.g., media services), and interacts with, for example, a configuration server in the management framework 260, to determine an interactive voice response (IVR) profile, voice application (e.g. Voice Extensible Markup Language (VoiceXML) application), announcement, and conference application, resource, and service profile that can deliver the service, such as, for example, a particular MCP 220.

Services may be used as part of creating a particular end-user experience. Examples of services may include announcements, conferencing, VoiceXML, Call Control XML (CCXML), text-to-speech (TTS), automated speech recognition (ASR), and the like. Further, one service (such as VoiceXML) may make use of other services (such as ASR) as part of its operation.

After the RM 210 has identified an IVR Profile and service type, it identifies a resource group that can provide the service. Then, on the basis of the load-balancing scheme for the group and the status of individual physical resources in the group, it allocates the request to a particular physical resource. A resource may be, for example, a particular MCP 220 or third-party component that is capable of providing a SIP-based service. A resource may be capable of offering multiple services. For example, a particular MCP may be capable of offering VoiceXML, conferencing, announcement, and msml services.

According to one embodiment, the MCP 220 is configured to provide call and media services upon request from a service user. Such services, include, without limitation, initiating outbound calls, playing music or providing other media while a call is placed on hold, call recording, conferencing, call progress detection, playing audio/video prompts during a customer self-service session, and the like. Accordingly, in one embodiment, the MCP 220 may include all necessary hardware (e.g., media devices) and software for delivery and playback of the media services to an end-user device.

According to one embodiment, applications define how the RM 210 uses available services to implement the desired behavior on a session. Applications define how logical requests received by the RM 210, such as, for example, an incoming call with a particular DNIS value, is translated into concrete service requests that can be executed, such as running a VoiceXML application with a particular URI. Applications may define service parameters that govern how services behave when they are invoked. For example, a VoiceXML application might be a parameter that defines whether or not speech recognition can be used by the application. Applications may also be important for reporting purposes. For example, one or more of the services may be defined by voice applications (e.g. VoiceXML applications) that are executed as part of the process of establishing a media session between the MCP 220 and the service user.

According to one embodiment, a session is the grouping of a set of related services that are used to deliver an end-user experience. For example, if an incoming call request (implicitly from a Gateway service) is handled using a VoiceXML service, and the VoiceXML service in turn makes use of the ASR service, this chain may be considered to comprise a single session. Sessions may not just be triggered by incoming calls from gateways; several interfaces may be used to cause an outbound call to be placed by the VoiceXML service, which would invoke both the Gateway service (to reach the end-user) and also the ASR service (to recognize user input).

In one example where customer self-service is to be provided for an inbound call, the call comes in to an edge device (e.g. a session border controller which is not shown, but could be located in front of the SIP server 250, such as, for example, as part of the switch/media gateway 12 shown in FIG. 1) and is forwarded to the SIP server 250. In a multi-tenant cloud environment, the edge device is configured to identify a tenant to which the call is directed, and identify the SIP server configured for the tenant (e.g. based on the inbound phone number that was dialed).

According to one embodiment, tenants provide a logical partitioning of the RM 210 behavior, allowing each tenant to have its own applications, resources, and policies. Tenants are hierarchical such that sub-tenants may be defined within a tenant, with controlled inheritance of resources and policies from a tenant to its sub-tenants. Decision making performed by the RM 210 may be driven based on the provisioning of the tenant hierarchy. Applications are defined by a tenant, and may inherit some properties from the tenants that own them. As the definitions of application and service imply, execution of an application may utilize several resources within, for example, the contact center environment. Each resource is associated with a tenant, and resources are generally used to service sessions owned by the same tenant or its sub-tenants.

According to one embodiment, the SIP server 250 passes the call to the RM 210 by sending a signaling message (e.g. SIP INVITE message) to the RM 210 to establish a communication session. According to one embodiment, there is no separate SIP server set up for the tenant, and some of the functionalities of the SIP server 250 are instead incorporated into the RM 210. According to one embodiment, the RM 210 is shared by multiple tenants.

The RM 210 is configured to identify the contact center associated with the SIP server 250 generating the signaling message (e.g. based on a source address of the SIP server), and further identify a voice or call-control application (referred to as an interactive voice response (IVR) profile), and a service/resource for the request. The particular service that is requested may be identified, for example, in the signaling message to the RM 210.

The RM 210 is configured to identify the appropriate MCP 220 instance from a cluster of MCP 220 instances based on the IVR profile, load balancing considerations, and the like, and forward a request to the identified MCP 220. In forwarding the request, the is configured to insert additional headers or parameters as specified by the service requirements, service parameters, and polices that have been configured for the IVR profile.

The MCP 220 is configured to fetch the voice application from, for example, a web application server 270, via an HTTP request. The web application server 270 hosting the voice application may reside in a remote operations environment or contact center premise.

According to one embodiment, the MCP 220 includes an interpreter module for interpreting and executing the voice application. In some embodiments, the MCP 220, through the RM 210, may invoke additional services such as, for example, automatic speech recognition or text-to-speech services, from the speech servers 280.

An RTP media path may be established between the MCP 220 and the end user device 205 through the edge device, upon the executing of the voice application. The RM 210 ends the call when one of the parties (end user device 205 or MCP 220) disconnects (e.g. at the end of self-service), or when the call is transferred out of the voice platform 200 (e.g. transferred to an agent).

According to one embodiment, during a particular call, the RM 210 may need further instructions from the SIP server 250 in order to further service the call. For example, the RM 210 may need instructions as to a next action to take after a particular media file is finished playing. In the event that connection to the SIP server 250 fails, the RM 210 fails to receive such instructions from the SIP server 250, leaving dead air to the caller 205 until the call is disconnected.

According to one embodiment, connection to the SIP server 250 may fail because the SIP server 250 has failed and the backup SIP server is in the process of taking over. In some cases, the connection may fail because the physical connection to the SIP server 250 is broken.

According to one embodiment, the RM 210 may assume failure of the SIP server 250 without sending any probing, pinging, or signaling messages to the SIP server 250. For example, after a particular media file is finished playing, the RM 210 may expect certain instructions from the SIP server 250 in order to further service the call. The SIP server 250 may know when the media file is finished playing when, for example, it receives the caller data input by the caller 205 from the IVR/IMR server 240. According to one embodiment, the RM 210 may expect to receive further instructions from the SIP server 250, for example, to either play another media file or to transfer the call (e.g., transfer to an agent). When the RM 210 does not receive the further instructions from the SIP server 250, the RM 210 may assume that connection to the SIP server 250 has failed.

According to one embodiment, a keep alive protocol (e.g., an Advanced Disconnect Detection Protocol ADDP) may be included in the RM 210 and/or the SIP server 250. The keep alive protocol may be configured to send a ping message to the RM 210 and/or SIP server 250 during specified increments of time. According to one embodiment, the keep alive protocol included in the SIP server 250 may be configured to send a ping message to the RM 210, for example, every 5 seconds. In this example, the RM 210 may expect to receive a ping message from the SIP server 250 every 5 seconds. When the RM 210 expects to receive a ping message from the SIP server 250, but does not receive the ping message at the expected time or fails to receive a consecutive number of ping messages, the RM 210 may assume that connection to the SIP server 250 has failed. The SIP server 250 may fail to send the ping message when, for example, there is a switchover from a primary SIP server to a backup SIP server.

According to one embodiment, the RM 210 detects failure of the SIP server 250 in response to a failed probing message to the SIP server 250. The probing message may be, for example, a SIP INFO message that is sent by the RM 210 to the SIP server 250. According to one embodiment, the probing message may fail if it is sent at a time when there is a switchover from a primary SIP server to a backup SIP server.

According to one embodiment, after detecting failure of the connection to the SIP server 250, the RM 210 continues to retry according to configurable parameters (e.g., set retry parameters) until there is a successful connection, the configured number of retries is exhausted, or a configured timeout time is reached. If no connection is made, the RM 210 is configured to instruct the MCP 220 to disconnect, causing the RTP media path to be disconnected.

According to one embodiment, the SIP server 250 may provide instructions to play a sequence or set of VoiceXMLs, so that in the event the SIP server 250 becomes unavailable, the RM 210 may cause a next one of the VoiceXMLs within the sequence of VoiceXMLs to be played. This may help avoid the dead air that may occur during a switchover from a primary SIP server to a backup SIP server. This case may occur in situations where the next one of the VoiceXMLs to be played does not depend on an outcome of a previous VoiceXML (e.g., is not customer input dependent). When the SIP server 250 is responsive, it may update the sequence or set of VoiceXMLs to be played depending on an outcome of a previous one of the VoiceXMLs. In one embodiment, the sequence or set of VoiceXMLs may be stored in a datastore (e.g., a cache), which may be accessed by the MCP 220 when instructed to play the next one of the VoiceXMLs. In one embodiment, the sequence or set of VoiceXMLs may be retrieved by the MCP 220 from the web application server 270 when instructed to play the next one of the VoiceXMLs.

According to one embodiment, when the SIP server 250 failure is detected, the RM 210 may cause a default VoiceXML to be played (e.g., "apologies—trying to fix"), while it is in the process of retrying the connection or when the failure is detected. In this case, when the number of retires is exhausted, or the timeout value is reached, the RM 210 may cause another default VoiceXML to be played (e.g., "apologies—please redial"), and may cause the call to be disconnected. According to one embodiment, the RM 210 may be preconfigured to cause the default VoiceXMLs to be played in the event of the SIP server 250 failure. According to one embodiment, the SIP server 250 may provide instructions (e.g., in advance) to play the default XMLs in the event that the SIP server 250 failure occurs.

According to one embodiment, if a disconnected customer calls back within a suitable timeframe, the conversation may resume from a point in the conversation of the SIP server 250 failure. For example, as described in U.S. Pat. No. 8,831,203, the entire content of which is incorporated herein by reference, an instance of unsuccessful or incomplete interaction between the callback customer and the contact center may be identified, and session data may be used to resolve issues related to the unsuccessful or incomplete interaction. For example, in the case the customer is disconnected during playback of a VoiceXML, the playback may resume near or from the point the conversation was disconnected when the customer calls back.

According to one embodiment, the retry functionality of the RM 210 applies even if the SIP server 250 is not configured for high-availability and functions, instead, in a stand-alone mode.

According to one embodiment, in addition or in lieu of detecting failure of the SIP server 250 via, for example, SIP probing messages, the RM 210 may also detect loss of network connection by monitoring network signaling messages transmitted between different devices.

According to various embodiments, it may be desirable to identify the reason for the loss of connection to a SIP server 250 from a RM 210, and take particular actions in response to such identification. For example, it may be that the SIP server 250 is functional, but the connection to the RM 210 is unavailable due to failure of, for example, a network interface card on the computer device in which the SIP server 250 is running. In this regard, the computer device where the SIP server 250 is running may be configured with multiple network interface cards (NICs). For example, one NIC may be configured to communicate with, for example, a routing server, and another NIC may be used, for example, for communicating with the RM 210. If the NIC configured to communicate with the RM 210 fails, the RM 210 is unable to communicate with the SIP server 250, resulting in a failed probing and/or retry messages. In response to such failure, the RM 210 may be configured with logic to contact another server also known to communicate with the SIP server 250, such as, for example, the routing server, for inquiring about this server's ability to communicate with the SIP server 250. If this other server is able to communicate with the SIP server 250, the RM 210 may deduce that the failure is not of the entire SIP server 250, but the NIC that is used to communicate with the RM 210.

According to one embodiment, the RM 210 may be configured to take action in response to such knowledge, such as, for example, alerting an administrator of the need to check on the particular NIC card, and/or forwarding the information to the system control server 262. The system control server 262 may then be configured to instruct a load balancer (or edge device) in front of the SIP server pairs, to stop forwarding calls that require the particular RM 210, to the particular SIP server 250 that has lost communication capabilities with the RM 210. Without such information from the RM 210, neither the system control server 262 nor load balancer may be aware of the loss of communication to the RM 210 because the SIP server 250 itself is still functional. In another embodiment, the RM 210 may be configured to instruct the routing server to dynamically adjust the routing strategy to avoid portions of the routing logic that invoke the voice platform 200, such as, for example, IVR scripts. Thus, instead of servicing the call via an IVR server, the call may instead be routed directly to an agent.

According to one embodiment, the RM 210 may be configured to query the system control server 262 for status of the SIP server 250 and adjust its retry logic accordingly. For example the 210 is generally unaware of whether it is communicating with a primary or backup SIP server. However, the system control server 262 is aware of which SIP server is currently being invoked. Thus, according to one embodiment where probing messages are transmitted by the 210 to both the primary and backup SIP servers, the 210 may be configured to stop probing the primary SIP server if it knows, upon querying the system control server 262, that only the backup SIP server is up.

According to one embodiment, the 210 controls a set of MCPs 220. The pool of MCPs 220 may be made available to another resource manager in the event that connection to the SIP server 250 fails even after retries.

According to one embodiment, the 210 may be configured with logic to keep track and learn patterns (e.g., learned conditions) which cause communication to the particular SIP server 250 to be down. For example, analysis of historical data may indicate that connection to the SIP server 250 is always down on the first Monday of the month. Based on this knowledge, the 210 may be configured to proactively take action to, for example, reassign its pool of MCPs 220 to another resource manager.

According to one embodiment, maintenance/deployment procedures may be fine-tuned according to problems that have arisen during previous maintenance/deployments (e.g., learned conditions). For example, analysis of historical data may indicate that during certain deployments, certain links may be unreliable, but will be back up after a known delay, or that a certain instance of SIP server is hard to reach but another more reliable SIP server instance is known. In these cases, the RM 210 may be configured to retry after the known delay, or may automatically reassign its resources to another SIP server.

According to one embodiment, the RM 210 may access the configuration data of the SIP server 250 via the configuration server 29 that may be run within the management framework 260, and may dynamically adjust the timeout value and/or number of retries according to information that is obtained from the configuration data of the SIP server 250. For example, the RM 210 may learn that during certain periods of time or during certain days, the SIP server 250 may run slower (e.g., learned conditions). Thus, the RM 210 may dynamically adjust its timeout value and/or number of retries to be more patient during these times or days.

According to one embodiment, the RM may dynamically adjust the timeout value and/or the number of retries according to other dynamic conditions such as, for example, traffic load, and may dynamically adjust its time value and/or number of retries, may automatically reassign its resources to another SIP server, or may automatically reassign its pool of MCPs 220 to another RM.

According to one embodiment, when connection between the SIP server and RM 210 is lost, instead of having termination on the voice side (RTP channel) by telling the MCP 220 to disconnect, the RM 210 may be configured to transmit a message to the edge device causing the edge device to terminate the call by sending a SIP BYE message to the end user device.

Referring again to FIG. 2, according to one embodiment of the invention, the RM 210 may be responsible for managing access and routing to all resources hosted by the voice media server 27. This may include instances of the MCP 220, CCP 290, MS, and various connectors 295. It may also include third-party components, such as speech servers 280 and non-voice media servers. According to one embodiment, the RM 210 operates by acting as a SIP Proxy for requests to and/or from voice media server 27 components. The RM 210 may carry out one or more of the following tasks: deciding the application to be run, managing service requests within an application, inserting applications/service parameters, tenancy & policy management, resource tracking and management, and high-availability and scalability. Each of these tasks will be described in more detail below.

Deciding the Application to be Run

When a request comes into the voice media server 27, it may be desirable to know which voice application it needs to execute. There are a few different ways the voice media server 27 can decide which application it needs to execute. For example, the application to be executed may be specified by dialed number identification service (DNIS), or by treatments within a call.

Application specified by DNIS—in this scenario, when an incoming call comes into the voice media server 27, the voice media server 27 may use the DNIS to identify which voice application is to run. This may occur for situations where there is no computer telephony integration (CTI) in the system, or where the CTI provides the DNIS to the voice media server 27 to specify which application is to be run. In this situation, a voice media server 27 application may be modeled as a single application to be executed for an incoming call, where the incoming call corresponds to the DNIS.

Application specified as treatments within a call—in this scenario, another component (e.g. the CTI) may act as a master and may execute a number of "slave applications" on the voice media server 27. For this type of situation, the voice application may be modeled and written external to the voice media server 27 (e.g. with CTI programming languages), and when a voice service is desired as part of a call flow, the voice application may invoke a "treatment" on the voice media server 27. In this situation, a voice media server 27 service may be invoked as part of a master call flow being executed by the master voice application.

Managing Service Requests within an Application voice media server 27 components may provide multiple types of services. For example, an external user of the voice media server 27 components may make use of services such as VoiceXML, CCXML, Conference, Simple Announcement, MSML etc. Internally, while a voice media server 27 component is executing a service, it may make a request to other services, such as the ones above, as well as Outbound Calling, ASR, TTS, etc. The RM 210 may provide a front-end for requests made to these services. The RM 210 may co-ordinate between the multiple services, and may make the decision of whether a service may be used at any given time. These decisions may be influenced by the application being invoked, and may allow the platform operator to configure the policies of whether a service may be invoked. Examples of "policies" may be usage limits, time of day (in future), call originator, dialing rules, etc.

Inserting Application/Service Parameters

For each type of service within an application, the RM 210 may have the ability to allow the platform operator to configure a set of service parameters to be forwarded to the application. These application/service parameters may be defined on a per-application basis for each of the services used by the application, and may affect how the application is executed. For example, the RM 210 may allow the platform operator to configure the "default languages" for the VoiceXML services for the voice applications.

Note that for each of the services provided by the voice media server 27 components, the component owners may define which application/service parameters it desires. The RM 210 may merely provide a framework where it allows an application to define parameters which influences how the application is executed.

Tenancy & Policy Management

A functionality related to the three features described above is tenancy & policy management. Tenancy & policy management may allow a platform operator to segregate its services into multiple tiers, and may allow application identification, policy enforcement, and specification of application/service parameters in a multi-tier manner. When an incoming request is received by the RM 210, in addition to identifying which application is to be executed, it may also identify which tenant the application is for. The policy enforcement and application/service parameters may be affected by the other related tenants.

Resource Tracking and Management

Multiple types of services (e.g. VoiceXML, CCXML, Conference, ASR, TTS, etc) may work together to provide IVR services to a caller. Many different types of SIP resources are therefore desired within the IVR environment to provide this wide range of services. Furthermore, some resources may be able to provide many types of services (e.g. the MCP 220 can provide VoiceXML, announcement, conference, and msml services) and multiple components may request the same services (e.g. both the MCP 210 and the CCP 290 may need to make outbound calls and thus may need to access a PSTN gateway). The RM 210 may be the centralized component where the configuration of all the resources, and the services provided by each resource, is kept track of. Whenever a voice media server 27 component makes use of another service, it may form its service request and may route the request through the RM 210. The RM 210 may find a resource capable of handling the service and may forward the request to it.

In order to provide this functionality, the RM 210 may be aware of all the resources within a deployment. As such the RM 210 may: (1) get a set of SIP resources (and the services provided by each instance of the resource) available to be used for the voice media server 27, (2) monitor the health and current usage of these SIP resources and maintain a list of available servers, and (3) choose a below-capacity resource capable of handling an incoming service request and to route the request to it.

High-Availability and Scalability

As discussed above, multiple types of services (e.g. VoiceXML, CCXML, Conference, ASR, TTS, etc) may work together to provide IVR services to a caller. Each instance of these components may not be highly available, and they may also have widely disparate port density on a machine. A typical technique to deal with this is that, if component A is to make use of service B, component A will support configuration of a set of servers supporting service B. Component A will periodically monitor each of these servers to determine whether the server is dead or alive. When component A needs to use service B, it will pick a server from the list of alive servers and send a request to the server, using some load balancing technique (e.g. round-robin, least-use, etc) to avoid overloading some particular server. More advanced techniques may be implemented, such as component A retrying another server if the request sent to a server has failed, or component A being configured with a primary and secondary list of servers, and the servers from secondary list is added to the server pool one-by-one as servers in the primary list fails.

With many types of services being used by each of the voice media server 27 components, it may be a lot of work for each of the components to implement the above-described techniques for each of the services they will make use of. Furthermore, it may also be complex from a configuration perspective to provide a list of servers for each of the services for each of the components. According to one embodiment of the invention, the RM 210 may provide these high-availability and scalability features for the voice media server 27 services. This may simplify the other components, so that when a component makes use of a service, the request is sent to the RM 210, and the RM 210 will forward the request to an available server. Since the voice media server 27 services may be SIP-based, the RM 210 may only need to implement generic SIP-based techniques.

According to one embodiment, to avoid becoming a single-point-of-failure, the RM 210 itself may also be highly available and scalable. For example, the RM 210 may be deployed as a coordinating cluster of nodes. The RM 210 may use cluster virtual IP technology so that it appears as a single entity to the components making use of voice media server 27 services, and may share session data between RM nodes to reduce the impact of RM node failures.

Also, the RM 210 may support to be deployed as an active-active cluster. In this configuration the session data sharing between the two RM nodes remains the same, however, there may be a SIP-aware load-balancer (e.g., F5 or Radware) in front of the RM nodes to distribute requests to any of the active RMs in a load-balancing fashion.

Component Interfaces

According to some embodiments of the invention, the RM 210 may interact with components within the architecture using 4 interfaces: a SIP interface for call handling; an interface with the management framework 260 for retrieving configuration and provisioning information; and two interfaces with the reporting server 265: the CDR interface, and the Operational Reporting interface. Each of these interfaces will be discussed in more detail below.

SIP Support

The SIP interface offered by the RM 210 according to some embodiments may be one of the more critical interfaces in the architecture. This interface may be used both by voice media server 27 components to communication with one another, and by external SIP-based network elements making use of voice media server 27 components.

External entities may use this interface as the primary means of accessing any voice media server 27 services. In other words, this interface may essentially be the external-facing SIP interface that may be used without knowing the details of various other interfaces that may be used internally. This interface may also hide the topology of internal components, performing load balancing across multiple component instances, thus simplifying the process of interacting with the voice media server 27 (e.g., GVP) components.

Similarly, internal components may use this interface in order to make use of services offered by other components (such as, for example, the MCP 220 making use of a speech server 280), without each component requiring an awareness of the location and status of each candidate resource for fulfilling a request.

According to some embodiments, this interface may be based entirely on the standard SIP. However, it may dictate additional conventions on SIP messages to enable certain capabilities of the RM. The SIP interface, according to one embodiment, may be defined by the use of the protocols listed below:

| | |
|---|---|
| RFC 3261 | This standard is used for establishing and terminating sessions. INVITE, BYE, ACK, CANCEL, and their respective responses must be supported. UDP, TCP, and TCP/TLS (SIPS) transports are all required. Awareness of multi-homing is required; the ability for a given component to support multiple logical SIP interfaces is desirable. The RM must support being a stateful proxy, as described in section 16 of this RFC. |
| RFC 3261 | The RM acts as a registrar, accepting SIP REGISTER requests from other components of a GVP deployment (including $3^{rd}$-party media servers and speech servers). The RM is capable of maintaining multiple independent registrations. Note that a separate set of SIP transports are used for processing REGISTER requests (for which the RM acts as a SIP UAS) and for processing all other requests (for which the RM acts as a SIP Proxy). |
| RFC 3261 | The RM may be configured to send REGISTER message to other components upon startup and is capable of sending period REGISTER refresh messages, according to the rules specified in RFC 3261 |
| RFC 3263 | This RFC defines the way by which the RM will route SIP requests. |
| RFC 3515 | For REFER messages sent within an existing dialog, it will be forwarded within the dialog as normal in-dialog messages.<br>For REFER messages sent outside of a dialog, they are treated as requests for service, and follow similar service identification procedures as for new INVITE requests. A new RM session is created as a result of handling the REFER message. |
| RFC 4028 | The RM supports the Proxy section (Section 8) of the RFC. It inserts a Session-Expires header to initial INVITE requests if one is not present, and it monitors the SIP traffic for session to observe when a SIP session is stale. When the RM detects a session has expired, it cleans up its internal state (application/tenant/resource usage) for this session as if a BYE has been received. |
| RFC 4240 | The Resource Manager uses this RFC for service identification, although the service identification mechanisms used go beyond those defined in RFC 4240. However, the convention for service identification is similar to what is defined in RFC 4240 for those services. |
| RFC 4244 | The Resource Manager supports two aspects of this RFC:<br>The RM examines the History-Info header of an incoming request, and depending on configuration, may use the first entry of the History-Info headers to determine the DNIS for the request. |
| draft-ietf-mediactrl-vxml | The "SIP Interface to VoiceXML Media Services" draft is supported by the RM, to form VoiceXML requests which are sent to the MCP from the provisioned information.<br>A custom SIP header X-Genesys-GVP-Session-ID is defined for all SIP requests. This header is used to recognize related requests. For instance, a bridge transfer performed by the MCP would result in an outbound call that is correlated with the inbound call; a request for a conference bridge by a CCXML session could be correlated with the inbound session. If such a header does not already exist, it is created and inserted by the Resource Manager and pushed to other GVP components when a new session is created. The GVP components are responsible for inserting this header in subsequent requests made within the context of that session.<br>SIP Request-URI parameters/headers that are not reserved by this interface will generally pass through. Thus, if a SIP entity is making a request for the dialog service using draft-burke-vxml, SIP Request-URI parameters such as 'maxage' that are defined by that draft will pass through to the selected resource. In other words, this interface is transparent with respect to features are behavior defined by other interfaces to the extent that they exist outside of what is directly defined by this interface. |

| | |
|---|---|
| RFC 3265 | The RM acts as a Notifier, accepting SIP SUBSCRIBE requests from other components of a GVP deployment (currently SIP Server only). The RM is capable of maintaining multiple independent subscriptions (from the same or different SIP devices). Note that a separate set of SIP transports are used for processing SUBSCRIBE requests (for which the RM acts as a SIP UA). However, subscribers can use the RM proxy transport also for subscribing (internal RM logic). |
| draft-saleem-msml | This draft mentions the use of "msml" as user part for standard 3PCC establishment of a user initiated media session to a media server. This is the equivalent of a dial-in conference participant. |
| RFC 3262 | The RM proxies the PRACK message received as per RFC 3262. |
| RFC 3455 | The RM examines the P-Called-Party-ID header of an incoming request, and if the header is present, uses the user-part of it to determine the DNIS for the request. |
| RFC 2474 | For all outgoing SIP messages, RM sets the IP TOS field based on the configuration. |
| RFC 3581 | The RM supports "rport" as specified in section 4 of RFC 3581. |

Management Framework Interface

According to some embodiments, the resource manager RM 210 may be more tightly integrated with the management framework 260 than other voice media server 27 components, since it is the focal point for delivering higher-level services (such as, for example, multi-tenancy) based on configured application and tenant provisioning. Furthermore, the RM 210 may need to know about the SIP resources and what services each of these SIP resources provide.

According to one embodiment, the RM 210 may integrate with the *CCILib library* to receive configuration information from the management framework 260, and to output logging data in a consistent or substantially consistent manner as the other components.

According to one embodiment, the RM 210 may also expose its health monitoring information to the monitoring interface of the management framework 260. It may expose the current/total/max number of calls for each resource, logical resource group, application and tenant. The max may be the max since the time started, and may not be reset during the RM's lifetime. The current may be the current number of calls at the time of the query. The total may be the total number of calls handled since the RM 210 started.

What the RM 210 may not be reporting directly to the management framework 260, according to some embodiments, is a list of all the in-progress calls. This may place too much load onto the RM 210, so this information may come from the reporting server 265 database. The RM 210 may generate the CDR entries (which will get routed to the RS database) in real time as the call starts and terminates.

Reporting Server Interface

According to some embodiments, the resource manager RM 210 may integrate with the reporting server 265 by two interfaces: the CDR Service API, and the Operational Reporting API. Whenever a new RM session is created or destroyed, or whenever a SIP Call is created or destroyed, the RM 210 may log an entry via the CDR Service API. This may be done relatively close to real time so that real-time call log browser can be generated from reasonably recent data. At the same time CDR entries are generated, the RM 210 may also send the relevant peak information for the Application/Tenant/Resource via the Operational Reporting API.

User Interfaces

According to some embodiments, the User Interface for the RM 210 may make use of the standard user interfaces provided by the management framework 260.

Example Use Cases

According to one embodiment, the RM 210 supports retrying of sending SIP request messages on a reliable channel (e.g., TCP) when it encounters an error during channel establishment.

A user may enable the retry of sending SIP request messages per gateway by, for example, using below gateway configuration parameters:
 retrydest-on-conerr=<virtual ip:port>
 connerr-retry-timeout=<timeout in milli seconds>
 connerr-max-retries=<Number of times retry should happen>

The below steps may be used, for example, to configure the above parameters through GA:
 1) Edit the RM Application.
 2) Select the particular Gateway from "Connections" section for which the above parameters needs to be added.
 3) Click "Edit" button and select the "Advanced" tab.
 4) Enter the above configured parameters in the "Application Parameters:" text box with ";" (semicolon) separator.

RM 210 may add the above parameters to a session ID header (e.g., X-Genesys-Session-ID header) while forwarding the request to MCP 220 from specific SIP-S gateway resource. Hence, any SIP request that is made from MCP 220 to SIP-S 250 via RM 210 may contain these configured parameters inside the message.

In RM 210, when SIP stack fails to send an outbound TCP/TLS request while sending a SIP message (applicable for Non-INVITE client SIP request) due to connection unavailability, then it may check if the destination is matched with the configured value for the "retrydest-on-conerr". When both are same then stack may retry sending the message to same destination after configured timeout (through parameter "connerr-retrytimeout").

Figure 3:
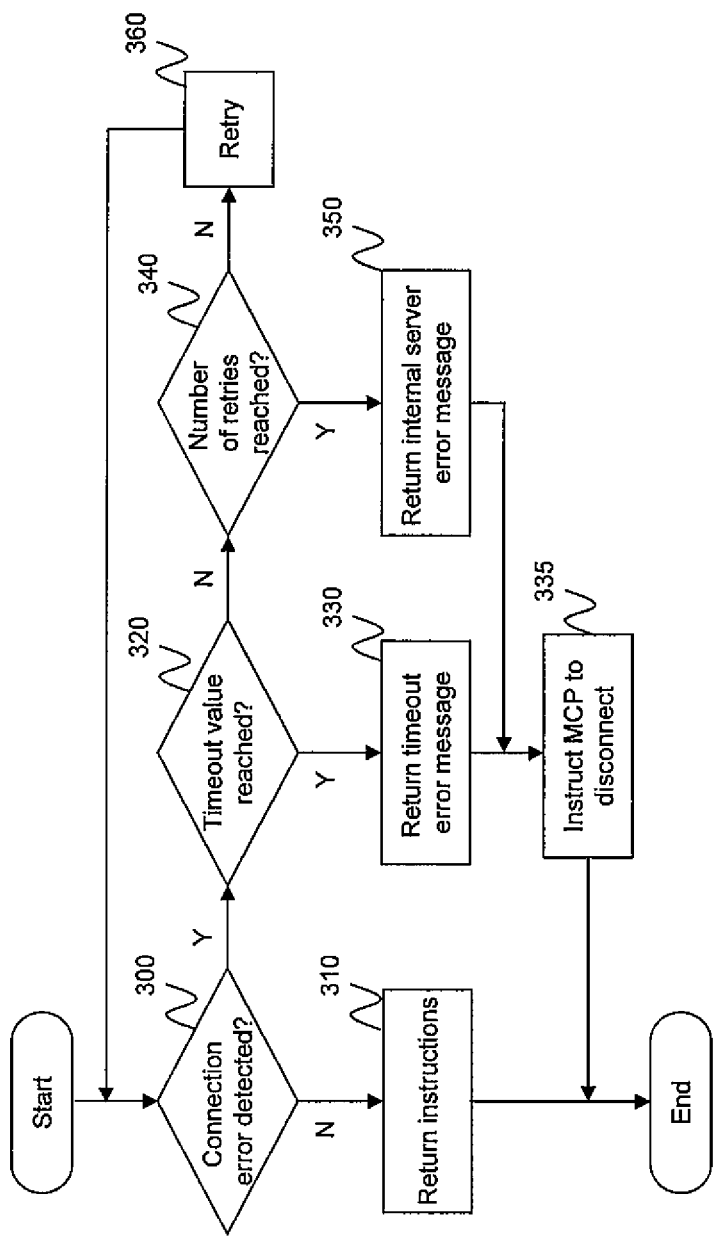
FIG. 3 is a flow diagram of a process for handling a SIP connection error according to an embodiment of the present invention.

The retry of sending message may be continued until at least one of the following occurs:
 it gets the successful connection (in this case, RM 210 may forward the received successful response to the originator of the request);
 it exhausts the number of retries configured through "connerr-retries" (in this case, RM 210 may return 500 Internal Server error response to the originator of the request); or
 it reaches the Timer_F timeout (In this case, RM 210 will return 408 request timeout response to the originator of the request.) FIG. 3 is a flow diagram of a process for handling a SIP connection error according to an embodiment of the present invention. However, the present invention is not limited to the sequence or number of the operations shown in FIG. 3, and can be altered into any desired sequence or number of operations as recognized by a person of ordinary skill in the art. For example, in some embodiments, the order may vary, or the process may include fewer or additional operations.

Referring to FIG. 3, the process starts, and at block 300, the RM may detect a connection error of the SIP server. According to one embodiment, the connection error is detected after calls between the SIP server and RM, and between the RM and MCP, are established through a reliable connection. As described above, the RM may detect the connection error in a number of ways. For example, in one embodiment, the RM may be expecting additional instructions from the SIP server, and when it does not receive the additional instructions in a timely manner, the RM may assume failure of connection with the SIP server. In one embodiment, the RM may be expecting a ping from the SIP server at specified increments of time, and when it does not receive the ping from the SIP server, the RM may assume failure of connection with the SIP server. In one embodiment, the RM may send a probing message to the SIP server, and may detect failure of connection with the SIP server if the probing message fails.

According to one embodiment, the RM may send a TCP request (e.g., INFO, etc.) from the MCP to the SIP server. Here, the MCP may be configured with, for example, staticroutelist, where both the RM nodes contact is configured. Both calls of the RM to the SIP server and the MCP to the RM may be established through a reliable connection (e.g., TCP). However, the present invention is not limited thereto, and at least one of the call between the RM to the SIP and the MCP to the RM may be established through an unreliable connection (e.g., UDP).

If the RM does not detect the failure, for example, the RM receives further instructions from the SIP server, then at block 310, the RM returns the instructions to the MCP and the process ends.

If the RM detects the failure, then at block 320, the RM checks to see if a timeout value is reached. If the timeout value has been reached, then at block 330, the RM returns a timeout error message to the MCP, and instructs the MCP to disconnect at block 335. If the timeout value has not been reached, then at block 340, the RM checks to see if a number of retries has been exhausted. If the number of retries has been exhausted, then at block 350, the RM returns an internal server error message to the MCP, and instructs the MCP to disconnect at block 335.

If the number of retries has not been exhausted, then at block 360, the RM retries to establish connection with the SIP server.

Accordingly, the MCP should not timeout here until it receives one of the timeout error message or the internal server error message from the RM. Thus, the failover time (e.g., routefailovertime) should be configured accordingly.

According to one embodiment, in the case of UDP and no response after successful initial TCP connection to a destination, SIP stack may do failover after a failover timeout value (e.g., transport.routefailovertime), and may put the destination to unavailable list. Otherwise, such destinations may be marked available only after the failover timeout value (e.g., transport.routerecoverytime) time is elapsed.

Thus, when all of the destinations related to a group are marked unavailable when fail over time is elapsed, then all the destinations may be marked available and may retry again.

According to one embodiment, a configuration parameter (e.g., transport.unavailablewakeup) may be introduced for performing the behavior related to unavailable wakeup under HA mode.

When the above configuration parameter is set to "true" then all unavailable destinations may be marked available (whenever desired) before the expiry of, for example, timer "transport.routerecoverytime". The detailed behavior on how this may be accomplished is described below.

If the configuration parameter is set to "false" then the previous behavior of treating the destinations as unavailable until the timer "transport.routerecovertime" expires will prevail.

When "transport.unavailablewakeup" is set to "true" then for sending each new outbound request in HA mode, SIP stack may construct a list of available destinations for sending that request. The list of available destinations may be constructed by taking all the entries in the static route list or DNS SRV entries for the request destination, and removing the addresses that are present in the global unavailable pool. Destinations may be added to the global unavailable pool if sending a request to that destination failed at some point. Therefore, for the first outbound request, all entries in the static route list or DNS SRV entries may be added in the available list.

The list of available destinations described in the above step may be constructed only for the first attempt for sending the outbound request, and once constructed, the list may be stored inside the SIP message. If sending the message to the first destination in the available list fails, then the destination may be marked unavailable (added to the global unavailable pool), and sending of the message may be retried to the other destinations in the available list until there are no entries left.

Once a destination is chosen from the available list for sending the request, the available list for the SIP message may be updated by removing the chosen destination from the available list. This may be done so that available destinations for sending the message (in case all available destinations are down) are eventually run out, and sending of the message fails at some point.

While constructing the list of available destinations for sending new requests it may happen that all destinations are put in the global unavailable pool due to failed attempts while sending previous requests. When this happens then this request may have the authority to add all destinations listed in the static route list or DNS SRV records to its available list, and may clear these destinations from the global unavailable pool. Once the available list is constructed, this request may be sent in the same manner as described above. It should be noted that only the destinations added to the available list may be cleared from the unavailable pool, as the unavailable pool may have other destinations corresponding to the other static route list groups.

Each of the various servers, controllers, switches, gateways, engines, and/or modules (collectively referred to as servers) in the afore-described figures may be a process or thread, running on one or more processors, in one or more computing devices 1500 (e.g., FIG. 4A, FIG. 4B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 4A:
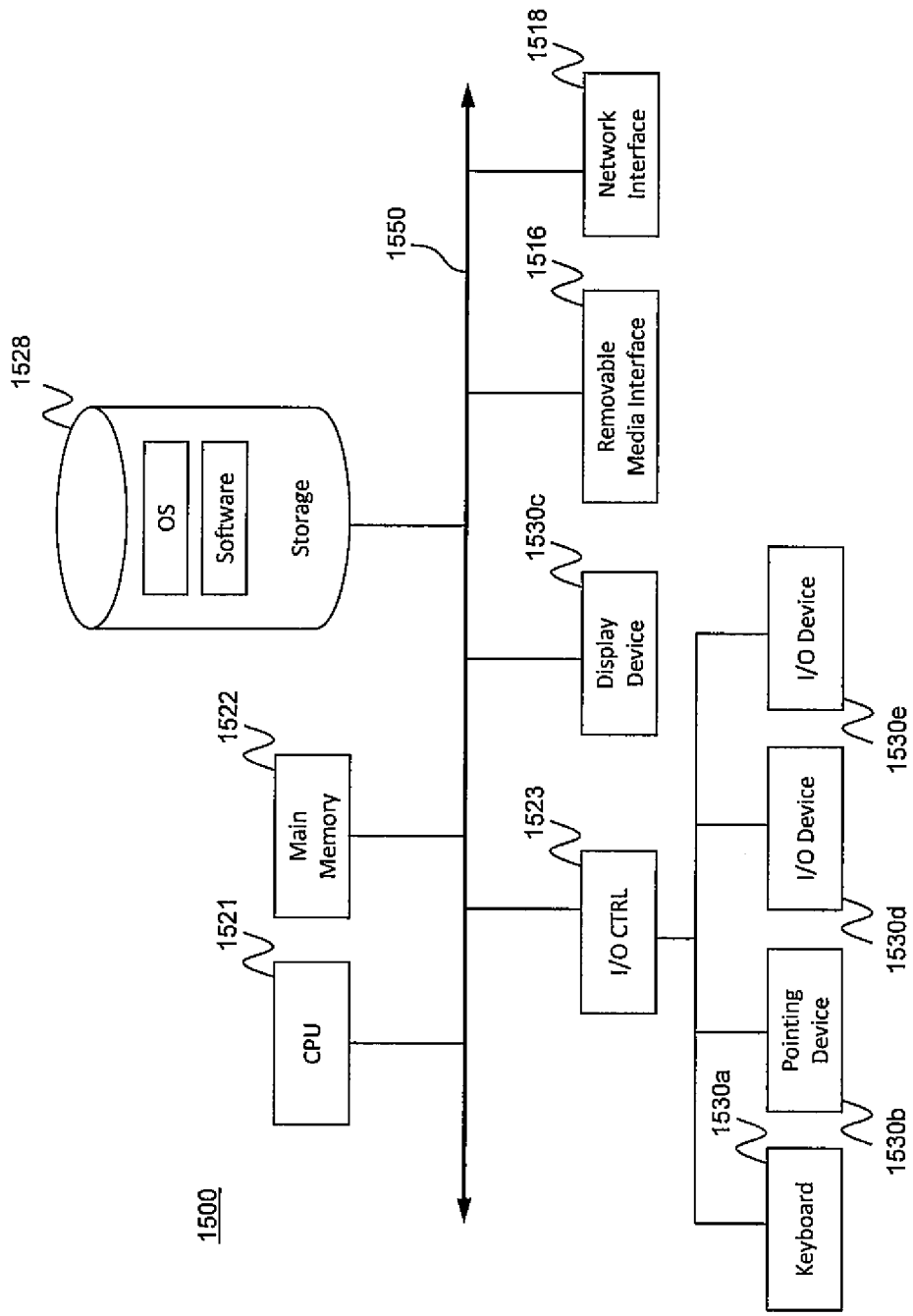
FIG. 4A is a block diagram of a computing device according to an embodiment of the present invention.
Figure 4B:
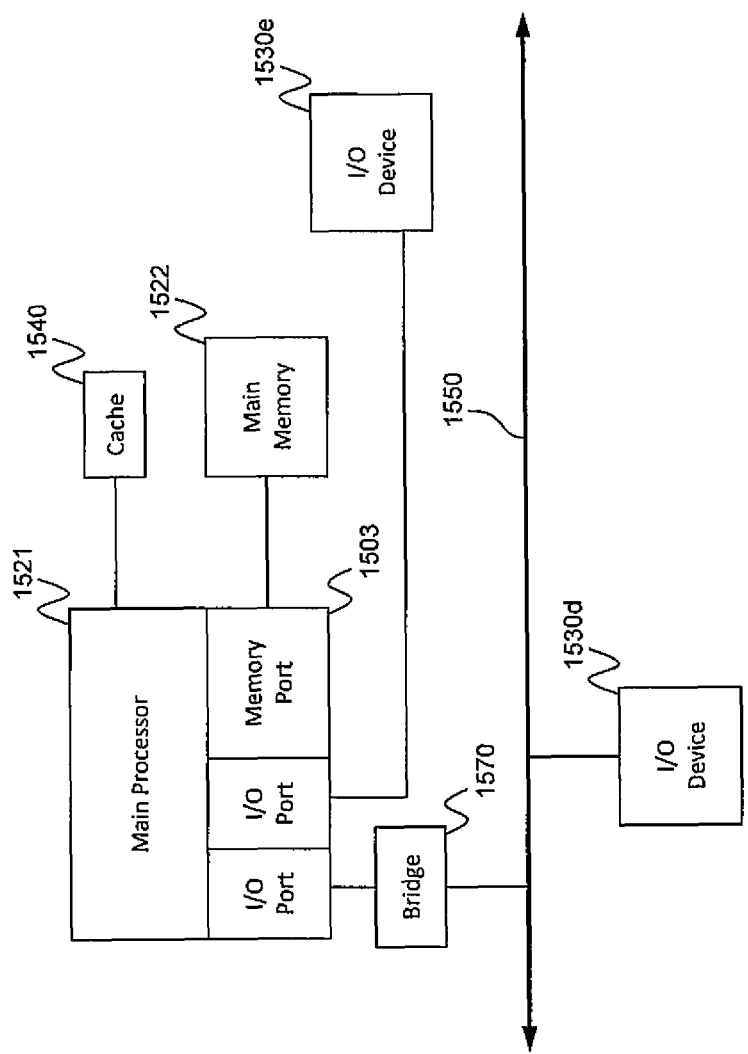
FIG. 4B is a block diagram of a computing device according to an embodiment of the present invention.

FIG. 4A and FIG. 4B depict block diagrams of a computing device 1500 as may be employed in exemplary embodiments of the present invention. Each computing device 1500 includes a central processing unit 1521 and a main memory unit 1522. As shown in FIG. 4A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 4B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 4A, the central processing unit 1521 communicates with the main memory 1522 via a system bus 1550. As shown in FIG. 4B, the central processing unit 1521 may also communicate directly with the main memory 1522 via a memory port 1503.

FIG. 4B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 4A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 4B depicts an embodiment of a computer 1500 in which the central processing unit 1521 communicates directly with I/O device 1530e. FIG. 4B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 4A, may control the I/O devices. The I/O controller may control one or more I/O devices such as a keyboard 1530a and a pointing device 1530b, e.g., a mouse or optical pen.

Referring again to FIG. 4A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 4A and FIG. 4B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 4D:
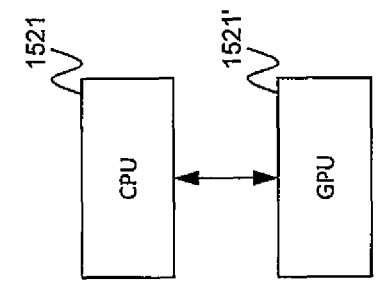
FIG. 4D is a block diagram of a computing device according to an embodiment of the present invention.
Figure 4C:
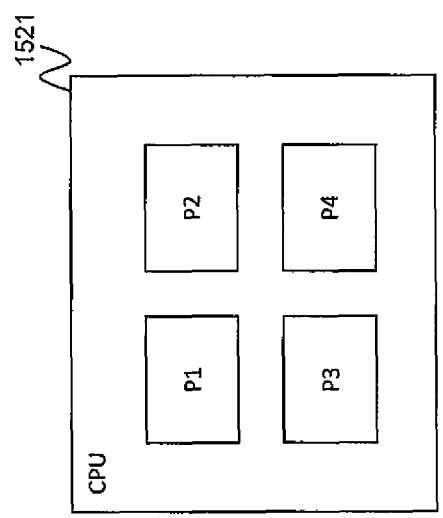
FIG. 4C is a block diagram of a computing device according to an embodiment of the present invention.

As shown in FIG. 4C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 4D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 4E:
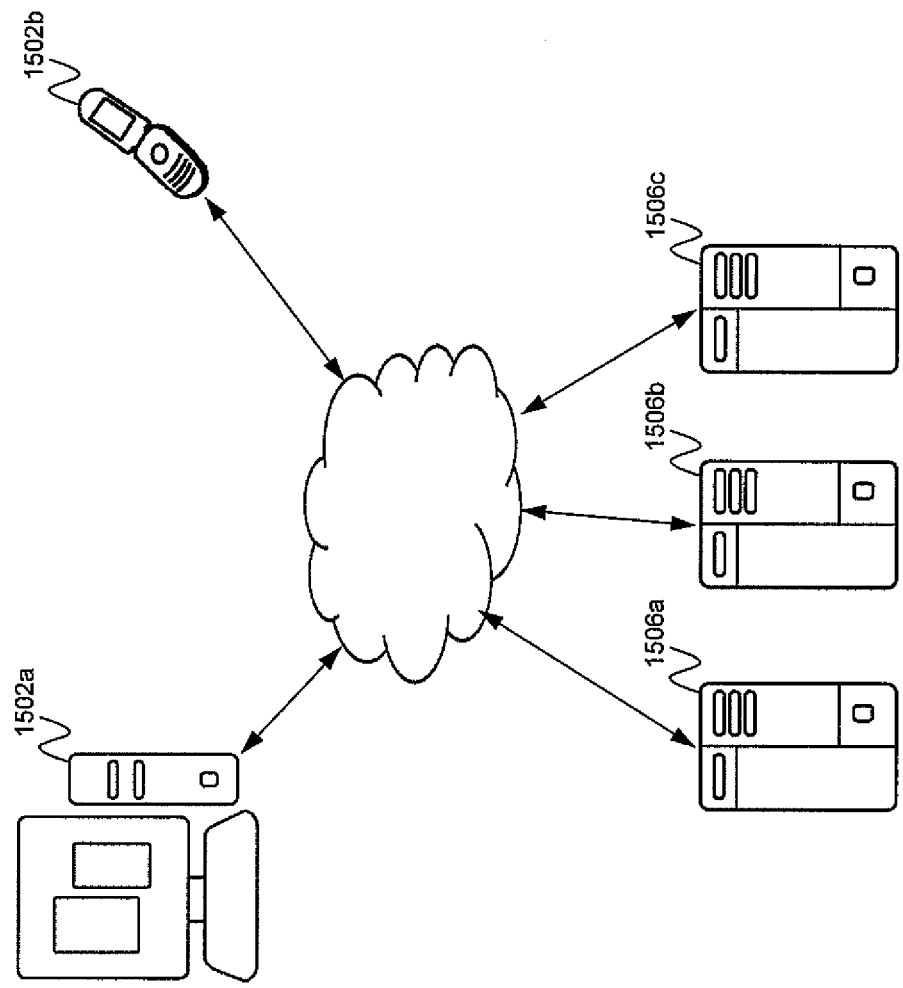
FIG. 4E is a block diagram of a network environment including several computing devices according to an embodiment of the present invention.

A computing device may be one of a plurality of machines connected by a network, or it may comprise a plurality of machines so connected. FIG. 4E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 4E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 4E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by claims and their equivalents rather than the foregoing description.

What is claimed is:

1. A system for providing media services on behalf of a customer contact center, the system comprising:
    a processor; and
    a memory, wherein the memory has stored thereon instructions that, when executed by the processor, cause the processor to:
        transmit and receive signaling messages to and from a control server over an established data network connection;
        in response to the signaling messages, invoke a media device for transmitting media to an end-user device;
        detect loss of the data network connection;
        identify a configurable parameter for determining whether a failed message transmission should be retried, wherein a value of the configurable parameter is dynamically adjusted during the transmitting and the receiving of the signaling message, based on learned conditions associated with the control server and the data network connection; and
        in response to determining that the failed message transmission should be retried, re-transmitting the failed message to the control server according to the learned conditions.

2. The system of claim 1, wherein the learned conditions further comprise data corresponding to an increase in load on the control server, the configurable parameter comprises at least one of a timeout value and a number of retries, and the adjustment of the configurable parameter includes at least one of increasing the timeout value and increasing the number of retries.

3. The system of claim 1, wherein the configurable parameter includes a number of retries.

4. The system of claim 3, wherein the instructions further cause the processor to:
    in response to exhausting the number of retries, return an error message.

5. The system of claim 1, wherein the configurable parameter includes a timeout value.

6. The system of claim 5, wherein the instructions further cause the processor to:
    in response to reaching the timeout value, return a timeout message.

7. The system of claim 1, wherein, in response to detecting the loss of the data network connection, the instructions further cause the processor to monitor network signaling messages transmitted between the control server and another server to determine whether or not the other server is able to communicate with the control server.

8. The system of claim 7, wherein the instructions further cause the processor to:
    in response to determining that the other server is able to communicate with the control server, instruct a routing server to rout calls directly to an agent.

9. The system of claim 1, wherein the instructions further cause the processor to:
    return instructions to play a media file stored in a datastore.

10. A method for providing media services on behalf of a customer contact center, the method comprising:
    transmitting and receiving, by a processor, signaling messages to and from a control server over an established data network connection;
    invoking, by the processor, in response to the signaling messages, a media device for transmitting media to an end-user device;
    detecting, by the processor, loss of the data network connection;
    identifying, by the processor, a configurable parameter for determining whether a failed message transmission should be retried, wherein a value of the configurable parameter is dynamically adjusted, by the processor, during the transmitting and the receiving of the signaling message, based on learned conditions associated with the control server and the data network connection; and
    in response to determining that the failed message transmission should be retried, re-transmitting, by the processor, the failed message to the control server according to the learned conditions.

11. The method of claim 10, wherein the learned conditions further comprise data corresponding to an increase in load on the control server, the configurable parameter comprises at least one of a timeout value and a number of retries, and the adjustment of the configurable parameter includes increasing, by the processor, at least one of the timeout value and the number of retries.

12. The method of claim 10, wherein the configurable parameter includes a number of retries.

13. The method of claim 12, wherein, in response to exhausting the number of retries, returning, by the processor, an error message.

14. The method of claim 10, wherein the configurable parameter includes a timeout value.

15. The method of claim 14, wherein, in response to reaching the timeout value, returning, by the processor, a timeout message.

16. The method of claim 10, further comprising:
    in response to detecting the loss of the data network connection, monitoring, by the processor, network signaling messages transmitted between the control server and another server to determine whether or not the other server is able to communicate with the control server.

17. The method of claim 16, further comprising:
    in response to determining that the other server is able to communicate with the control server, instructing, by the processor, a routing server to rout calls directly to an agent.

18. The method of claim 10, further comprising:
    returning, by the processor, instructions to play a media file stored in a datastore.

* * * * *